April 2, 1935. G. G. McNAMARA 1,996,250
METAL WHEEL
Filed Aug. 11, 1933 2 Sheets-Sheet 1

Inventor
Gordon G. McNamara

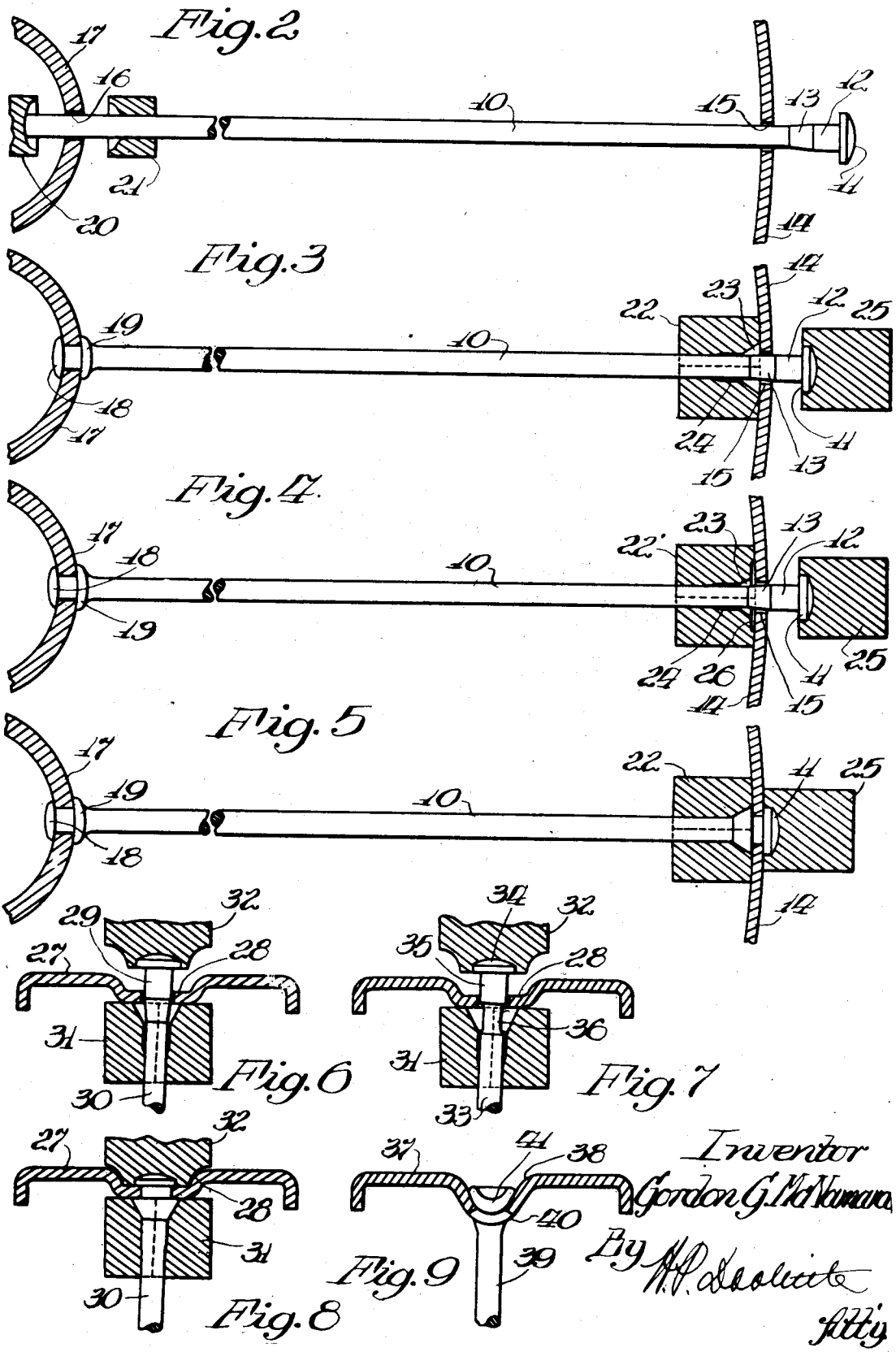

Patented Apr. 2, 1935

1,996,250

UNITED STATES PATENT OFFICE 1,996,250

METAL WHEEL

Gordon G. McNamara, Chicago, Ill., assignor to International Harvester Company, a corporation of New Jersey Application August 11, 1933, Serial No. 684,654

10 Claims. (Cl. 219—3)

This invention relates to a method of uniting metallic parts and adapted for use in the manufacture of metal wheels. More specifically, it relates to a novel method of securing the rim ends of a wheel spider to a rim.

The principal object of the invention is to construct improved wheels by a method of assembly in which the spokes may be secured to the rim in the most satisfactory manner with the greatest strength in the securing portion and with the control of tension in the spoke whereby the wheel will have the maximum strength for a given amount of material.

This object and others, which will be apparent, are attained by a method which consists, essentially, of forming a continuous rim with circumferentially spaced openings, placing a hub with spoke openings concentric to the rim, forming spokes with a head on one end, inserting said spokes through the openings in the rim and securing the head ends with the heads spaced from the rim, gripping each spoke adjacent the rim with a clamp shaped to permit the expansion of the spoke material for forming a shoulder inside the rim, heating the portion of the spoke adjacent the head by an electric current, and applying pressure to the head. Other features of the process will be described in the detailed description to follow.

In the drawings:

Figure 2 is a sectional view, showing a portion of the hub and rim of a wheel, a spoke in position for the first step of the method of the invention, and the dies in position for securing the hub end of the spoke;

Figure 3 is a sectional view, showing the same wheel elements as Figure 2 and in addition showing the forming elements for the rim end of the spoke;

Figure 4 shows a modification of the forming members as illustrated in Figure 3;

Figure 5 is a sectional view, showing the same elements as Figure 3 after completion of the heading portion;

Figure 6 is a sectional view through the rim, showing a modified rim section with the forming members in position with respect to the spoke end;

Figure 7 is a section through the rim, showing a modified spoke construction having a restricted portion for the concentration of heat;

Figure 8 is a sectional view, showing a completed operation with the structure shown in either Figure 6 or 7; and, Figure 9 is a sectional view through the rim, showing a modified rim section and a spoke end adapted to be used with such a section.

Figure 1:
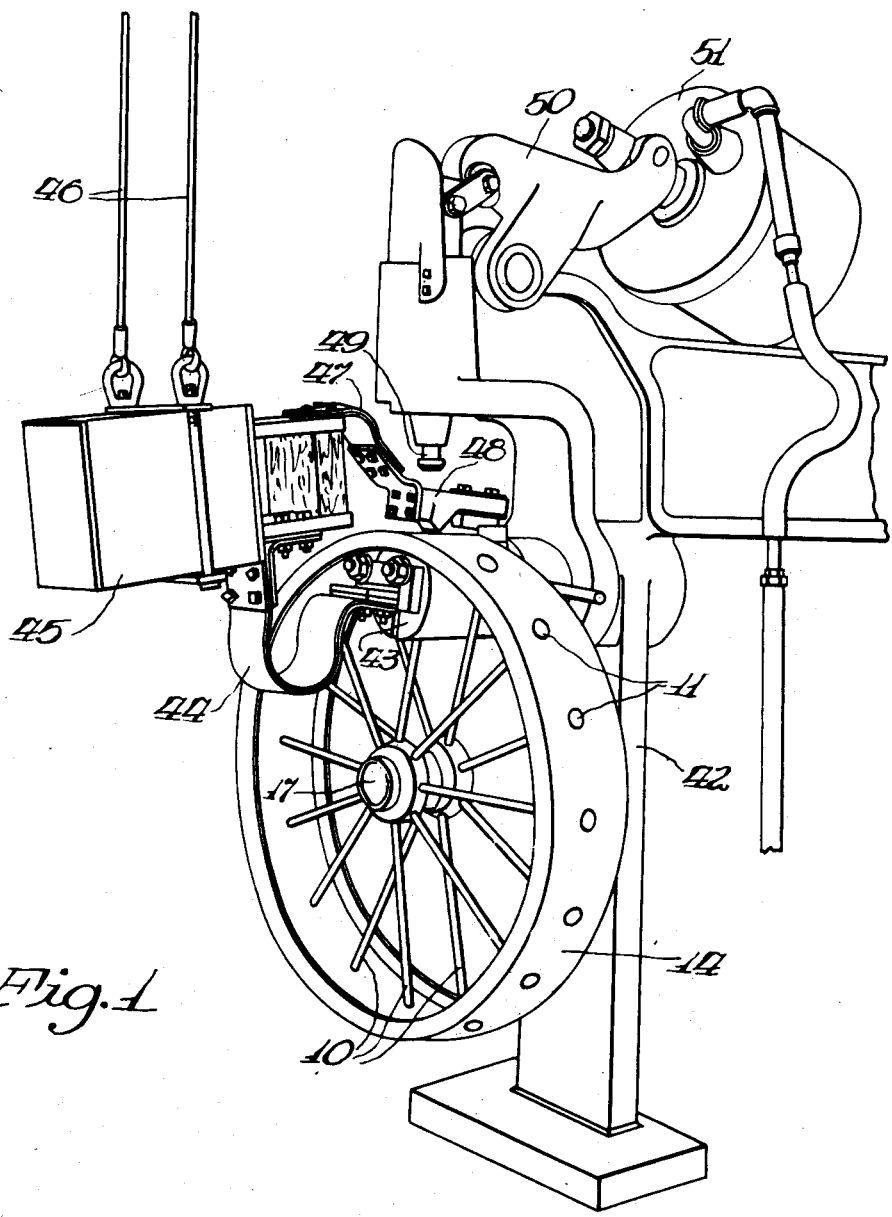
Figure 1 is a perspective view of a machine by which the method of the invention may be carried out. A wheel is shown in working position in the machine.

In the manufacture of metal wheels, there are a number of methods in common practice. In metal wheels of the class to which the present invention relates, there is a metal hub, a metal rim, and spokes joining the hub and the rim. This invention is particularly adapted for the tension type of wheels, that is, wheels in which the spokes are under tension. Wheels of this type have been generally used for agricultural implements. The spokes have been fastened at the hub ends by various means and to the rim by various means. In all of the practices now in use difficulty is encountered in getting the proper tension in the spokes. Either too little or too much tension has detrimental effects upon the load carrying ability of the wheel and upon its life.

As illustrated, a spoke 10, which is shown as circular in cross section, although any other suitable cross section might be utilized, is preformed by a heading operation with a head 11, an enlarged portion 12 adjacent the head, and a tapered portion 13 connecting the enlarged portion with the main body of the spoke. This spoke, formed as illustrated, is particularly adapted for being utilized in the method of the invention. Said spokes are inserted through the rim 14, circumferentially spaced openings 15 of a size slightly larger than the portion 12 being provided in the rim. The spokes are then inserted through circumferentially spaced openings 16 formed in a hub 17. The spokes are made of such a length that material is available for forming a head 18 inside the hub, as illustrated in Figure 3, and a shoulder 19 outside the hub. Suitable forming members, which may be formed as dies 20 and 21, are utilized for forming the shoulder 19 and the head 18. These dies and the method by which they are utilized are well known in the prior art. The spoke ends may be heated prior to insertion through the rim and hub, whereby the securing is done as a hot forming operation. The spokes may also be secured by cold heading or other securing methods. It is to be understood that the method by which the spoke ends are secured to the hub is not a principal part of the present invention, it being necessary only to secure said spokes against relative movement radially to the hub with the head 11 positioned a predetermined distance above the rim 14.

The second step of the operation is carried out by positioning a pair of forming members, which are combined dies and electrodes, in the proper position, as shown in Figures 3 and 4. The die 22, which is split into sections so that it may be placed around the spoke, is fitted inside the rim and securely clamped to the spoke in that position. Said dies may abut the rim, as shown in Figure 3, or may be spaced away from the rim, a portion of their face, as shown in Figure 4, illustrated by the dies 22'. It will be noted that the dies 22' abut the rim only at the narrow abutting edges spaced circumferentially from the spokes. The dies 22 are cut away with a conical recess 23 adjacent the spoke to provide for the formation of a shoulder within the rim. The dies are also cut away with a recess portion 24, to provide for slight expansion of the spoke at that location. An electrode or die 25 is applied to the head 11 of the spoke.

With the dies in position, as shown in Figures 3 and 4, sufficient pressure is applied to provide adequate electrical contact, and current is applied to the dies 22 and 25. Due to the chilling effect of the head and to the enlargement 12, the heating effect of the current is concentrated adjacent the tapered portion 13. When current has been applied in sufficient quantity for a sufficient time to heat the portion of the spoke above referred to, to a suitable forming temperature, the current is cut off and additional pressure is applied on the die 25, whereby the heated material is expanded into the recess 24 and the conical recess 23 to form a shoulder inside the rim. The opening 15 in the rim is also filled by expansion of the spoke. It will be understood that in the preparation of the spider for this operation the headed spoke end is positioned outside the rim just a sufficient distance to provide material for the shouldering operation. It may be necessary under certain conditions of operation to provide means for holding the spoke out of contact with the rim adjacent the spoke hole during the heating period. The head 11 is brought down flat against the rim 14 by the heading operation.

The operation is the same on the modification shown in Figure 4 as above described in connection with Figure 3, pressure being applied to the die block 25'. In this modification, however, the rim is deflected in a small distance, as permitted by the cut-away portion 26 of the die-block 22'. This inward deflection shortens the effective length of the spoke and gives the wheel tension greater than that attained by the normal operation on a form as shown in Figure 3. Figure 5 shows a completed rim end mounting as effected by the operation of the method as above described.

A modified rim section is shown in Figures 6 and 8, illustrating how the same securing method may be applied to a grooved rim. The flanged rim 27 is provided with a groove 28. Openings 29 are formed in the grooved portion of the rim. The spoke 30 is identical with the spokes above described and is secured to the hub in the same manner when constructing a wheel. The inner die 31 grips the spoke and seats on the center side of the groove 28, and the outer die 32, which fits the head of the spoke, is cut away at the sides, whereby it will fit into the groove when the shoulder is formed by compression of the spoke.

A modification is shown in Figure 7, utilizing the same rim as described in connection with Figures 6 and 8, and the same dies. It will be noted that the spoke 33 shown in this modification, in addition to the head 34 and the cylindrical portion 35 adjacent the head, is formed with a restricted portion 36 appreciably smaller in cross section than the main portion of the spoke. This modification may be used where it is found desirable to particularly concentrate the heat in a localized area. The smaller cross section intensifies the current density and increases the heating effect in that portion of the spoke. By variation in the amount of constriction or reduction in cross sectional area, the heating effect, as obtained by passage of an electric current, may be localized in any desired area and to any desired extent.

Figure 9 shows a modification in which a rim 37 is formed with a V-groove 38. In order to secure the spokes 39 to said V-groove by the method of this invention, a special head is formed on the spokes. As illustrated, the openings 40 formed in the bottom of the V are conically shaped, this effect being obtained by punching the holes prior to rolling in the V-groove. By the use of dies of proper shape the spoke material may be shouldered to seat against the conical opening, as illustrated. The head 41 of the spoke is also specially formed to accommodate the shape of the groove. This form is illustrated to show the wide variety of applications in which the method of this invention may be utilized.

In Figure 1 a machine has been illustrated by means of which the method of invention may be practiced. The machine consists of a frame structure 42. Clamping jaws 43 are provided with mechanism for clamping them in position around a spoke. Said jaws are supported on the frame structure 42. These jaws carry the dies or electrodes 22, or corresponding dies, as illustrated in Figures 6 to 9, inclusive. A conductor 44 is provided for transmitting current to said dies or electrodes. A transformer 45, represented as being suspended on cables 46, is utilized for supplying the heating current. A second conductor 47 is connected to a member 48, removably mounted above the jaws 43. Said member carries the dies 25 or the equivalent thereof. A plunger 49, adapted to be operated by linkage including a lever arm 50 pivoted on the frame structure 42, is positioned to engage the member 48 and to exert the necessary pressure thereon. A hydraulic cylinder 51 is connected to the lever arm 50 for applying pressure thereto. It is to be understood that the machine by which the method of the invention may be accomplished has been shown somewhat diagrammatically, as a wide variety of machines could be utilized for practicing the method of the invention.

In carrying out the method which has been described above, in connection with the description of the figures in the drawings, the wheel is first assembled, as shown in Figure 4, with the hub ends of the spokes secured in position and with the outer headed ends projecting from the rim. The wheel is then placed in the machine and a few of the spokes are riveted to center the hub with respect to the rim. Subsequently all of the spoke heads are formed, as shown in Figure 5. The particular details of operation of the machine and the variations in the steps utilized in the method have not been explained in detail, as the invention resides broadly in the preformed head on the spokes first positioned above the rim and subsequently brought into contact with the rim by electrical heating and by shouldering the excess material within the rim.

In the drawings and in the description, the connection at the rim end of the spoke has been illustrated and referred to. As a modified method, the spokes may be first secured to the rim and subsequently secured at their hub ends by the method of the invention.

Applicant wishes to claim as his invention all methods and all modifications thereof falling within the scope of the appended claims.

What is claimed is:

1. A method of securing a metal rod to a metal plate, which comprises forming an opening in the plate, forming a head on the rod, inserting the rod through the opening with the head spaced away from the plate, gripping the spoke adjacent the plate on the side opposite the head, heating the spoke electrically to bring a portion of the rod between the head and the location at which it is gripped to forging heat, and applying pressure to the head, whereby said head is pushed against the plate and a shoulder is formed on the opposite side of the plate.

2. A method of securing a rod between two relatively fixed elements with controlled tension, which comprises forming an opening in one element, forming a head on the rod, inserting the rod through the opening with the head spaced away from the element at its end, securing the other end of the rod to the other element, gripping the spoke adjacent the element at the head end of the spoke on the side opposite the head, heating the spoke electrically to bring a portion of the rod between the head and the location at which it is gripped to forging heat, and applying pressure to the head, whereby said head is pushed against the element and a shoulder is formed from the expanded material of the rod on the opposite side of the element.

3. A method of securing a metal rod to a metal plate, which comprises forming an opening in the plate, forming a head on the rod and a portion adjacent the head of greater cross sectional area than the rod, inserting the rod through the opening with the head spaced away from the plate, gripping the spoke adjacent the plate on the side opposite the head, heating the spoke electrically to bring a portion of the rod between the head and the location at which it is gripped and beyond the enlarged portion to forging heat, and applying pressure to the head, whereby said head is pushed against the plate and a shoulder is formed on the opposite side of the plate.

4. A method of securing a metal rod to a metal plate, which comprises forming an opening in the plate, forming a head on the rod and a portion adjacent the head of less cross sectional area than the rod, inserting the rod through the opening with the head spaced away from the plate, gripping the spoke adjacent the plate on the side opposite the head, heating the spoke electrically to bring the portion of the rod of less cross sectional area to forging heat, and applying pressure to the head, whereby said head is pushed against the plate and a shoulder is formed on the opposite side of the plate.

5. A method of securing a metal rod to a metal plate, which comprises forming an opening in the plate, forming a head on the rod, inserting the rod through the opening with the head spaced away from the plate, gripping the spoke adjacent the plate on the side opposite the head at a point spaced away from the plate, heating the spoke electrically to bring a portion of the rod between the head and the location at which it is gripped to forging heat, and applying pressure to the head, whereby said head is pushed against the plate and a shoulder is formed on the opposite side of the plate.

6. A method of manufacturing metal wheels, which comprises forming a continuous rim with circumferentially spaced openings, placing an apertured hub concentrically with respect to the rim, forming spokes with a head on one end, inserting said spokes through the openings in the rim, and securing the hub ends to the hub with the heads a predetermined substantially uniform distance above the rim, gripping the spokes adjacent the rim with a clamp shaped to permit the spoke material to be expanded to form a shoulder inside the rim, applying electric current through the head of the spoke, whereby a portion between the clamp and the head is heated to working temperature, and applying pressure to the head.

7. A method of manufacturing metal wheels, which comprises forming a hub and a continuous rim, forming one of said elements with circumferentially spaced openings, forming spokes with a head on one end, inserting said spokes through the openings, and securing the free ends of the spokes to the hub or rim with the heads a predetermined, substantially uniform distance above the other element, gripping the spokes adjacent the openings with a clamp shaped to permit the spoke material to be expanded to form a shoulder opposite the head, applying electric current through the head of a spoke, whereby a portion between the clamp and the head is heated to forging temperature, and applying pressure to the head.

8. A method of manufacturing metal wheels, which comprises forming a continuous rim with circumferentially spaced openings, placing an apertured hub concentrically with respect to the rim, forming spokes with a head on one end, inserting said spokes through the openings in the rim, securing the hub ends of the spokes to the hub with the heads a predetermined, substantially uniform distance above the rim, gripping the spokes adjacent the rim with a clamp shaped to permit the spoke material to be expanded to form a shoulder inside the rim, holding the hub and spoke against movement relative to the major portion of the rim while permitting deflection of the rim adjacent the spoke during the securing operation, whereby the tension in the spokes may be controlled, applying electric current through the hub of the spoke, whereby a portion between the clamp and the head is heated to working temperature, and applying pressure to the head.

9. A method of manufacturing metal wheels, which comprises forming a continuous rim with circumferentially spaced openings, placing an apertured hub concentrically with respect to the rim, forming spokes with a head on one end and a shoulder adjacent the head of larger sectional area than the diameter of the major portion of the spoke, inserting said spokes through the openings in the rim, and securing the hub ends to the hubs with the heads a predetermined, substantially uniform distance above the rim, gripping the spokes adjacent the rim with a clamp shaped to permit the spoke material to be expanded to form a shoulder inside the rim, applying electric current through the head of the spoke, whereby the portion between the clamp and the enlarged shoulder is heated to working temperature, and applying pressure to the head, whereby the shoulder adjacent the head is pressed into the opening in the tire and the excess length of spoke is expanded to form a shoulder abutting the inner side of the rim.

10. A method of manufacturing metal wheels, which comprises forming a continuous rim with circumferentially spaced openings, placing an apertured hub concentrically with respect to the rim, forming spokes with a head on one end, a shoulder adjacent the head of larger diameter than the diameter of the major portion of the spoke and a portion adjacent said shoulder of less diameter than the major portion of the spoke, inserting said spokes through the openings in the rim, hot riveting the hub ends to the hubs with the heads a predetermined substantially uniform distance above the rim, gripping the spokes adjacent the rim with a clamp shaped to permit the spoke material to be expanded to form a shoulder inside the rim, applying electric current through the head of the spoke whereby the portion between the clamp and the enlarged shoulder is first heated to working temperature, and applying pressure to the head, whereby the shoulder adjacent the head is pressed into the opening in the tire and the excess length of the spoke is expanded to form a shoulder abutting the inner side of the rim.

GORDON G. McNAMARA.